(12) United States Patent
Polette

(10) Patent No.: US 7,077,457 B1
(45) Date of Patent: Jul. 18, 2006

(54) VEHICLE PAW SUPPORT FOR DOGS

(76) Inventor: Robert R. Polette, 17155 SW. Florence, Aloha, OR (US) 97007

( * ) Notice: Subject to any disclaimer, the term of this patent is extended or adjusted under 35 U.S.C. 154(b) by 0 days.

(21) Appl. No.: 11/252,488

(22) Filed: Oct. 17, 2005

Related U.S. Application Data

(60) Provisional application No. 60/702,179, filed on Jul. 26, 2005.

(51) Int. Cl.
  *B60J 9/00* (2006.01)
(52) U.S. Cl. ...................................... 296/153; 248/118
(58) Field of Classification Search ................ 296/153; 248/118, 118.1, 118.5
  See application file for complete search history.

(56) References Cited

U.S. PATENT DOCUMENTS

| | | | |
|---|---|---|---|
| 1,462,787 A * | 7/1923 | Degendorfer | ................ 294/107 |
| 1,695,549 A * | 12/1928 | Hausler | ................. 297/411.22 |
| 1,715,862 A * | 6/1929 | Payton | .................. 297/411.22 |
| 1,760,450 A * | 5/1930 | Taylor | .................. 297/411.22 |
| 3,603,637 A * | 9/1971 | DePinto | ...................... 296/153 |
| 4,620,488 A | 11/1986 | Formo | |
| 4,730,760 A | 3/1988 | Keller | |
| 5,722,713 A | 3/1998 | Santa Cruz et al. | |
| 6,938,862 B1 * | 9/2005 | Orona | ........................ 248/118 |

* cited by examiner

*Primary Examiner*—Joseph D. Pape
(74) *Attorney, Agent, or Firm*—John Smith-Hill; Smith-Hill and Bedell

(57) ABSTRACT

A detachable support for an animal riding in a vehicle includes first and second substantially parallel plate-form members connected together at respective upper edges to form a hook structure that is adapted to tit over a window glass of the vehicle when the window glass extends upward from a sill of a window opening to a partially open position, with the first plate-form member being outside the vehicle and the second plate form member being inside the vehicle, whereby the support rests on the sill and is retained in position by engagement of the hook structure with the window glass. A third plate-form member extends inward from a lower edge of the second plate-form member, substantially perpendicular to the second plate-form member, whereby the third member forms a shelf extending inward from the sill. A layer of gripping material is adhered to an upper surface of the third plate-form member.

7 Claims, 3 Drawing Sheets

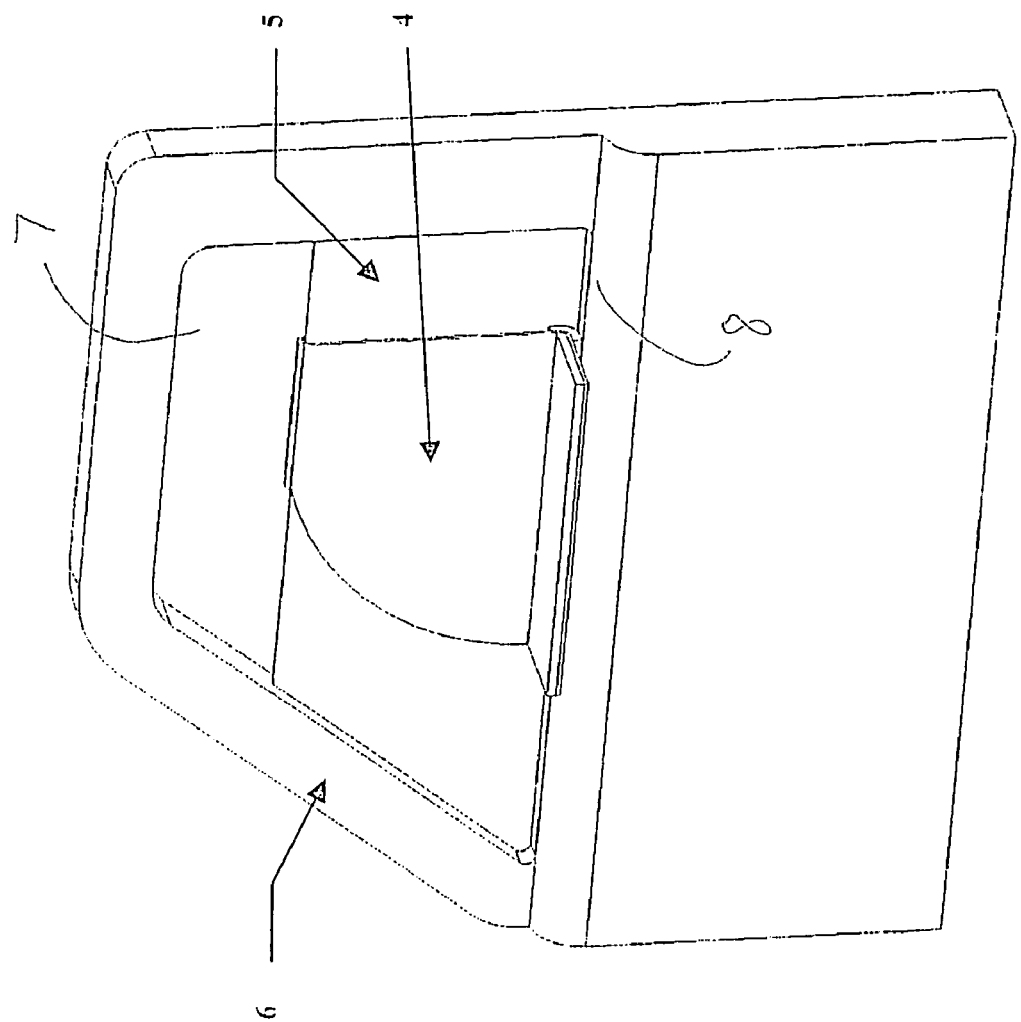

VEHICLE PAW SUPPORT FOR DOGS

CROSS-REFERENCE TO RELATED APPLICATION

This application claims benefit of U.S. Provisional Application No. 60/702,179 filed Jul. 26, 2005.

BACKGROUND OF THE INVENTION

This invention relates to a vehicle paw support for dogs.

It is well known that many dogs enjoy riding in vehicles, such as pick-up trucks and automobiles, and particularly enjoy extending their heads out of the partially open window. Typically, the dog's owner accommodates the dog's wishes in this regard by lowering one of the windows of the vehicle and allowing the dog to stand on the seat of the vehicle and extend its head through the partially open window. This is not an optimal solution, particularly for smaller dogs, since a small dog will generally place its paws on the window sill in order to stick its head out the window and the sharp and hard claws of the dog may mar the interior finish of the sill or the door panel. Further, if the sill is finished with a hard enamel that does not provide a good gripping surface, the dog's paws may slip from the sill, creating a risk of injury to the dog in the event of sudden deceleration or a sharp turn of the vehicle.

In some vehicles, the doors are provided with arm rests and power window control buttons are installed in the arm rests. If a dog wishing to stick its head out of the window places its front paws on the arm rest, it may actuate the window control thus driving the window glass downward and the dog, in its excitement, might leap from the vehicle through the fully open window.

SUMMARY OF THE INVENTION

According to a first aspect of the present invention there is provided a detachable support for an animal riding in an vehicle having a window glass that can be raised and lowered relative to a sill, said support comprising first and second substantially parallel plate-form members connected together at respective upper edges to form a hook structure that is adapted to fit over the window glass when the window glass extends upward from the sill to a partially open position, with the first plate-form member being outside the vehicle and the second plate-form member being inside the vehicle, whereby the support rests on the sill and is retained in position by engagement of the hook structure with the window glass, a third plate-form member extending inward from a lower edge of the second plate-form member, substantially perpendicular to the second plate-form member, whereby the third member forms a shelf extending inward from the sill, and a layer of gripping material adhered to an upper surface of the third plate-form member.

According to a second aspect of the present invention there is provided a vehicle having a window opening bounded at a lower boundary by a sill, a window glass, a mechanism for raising and lowering the window glass relative to the sill for closing and opening the window, and for holding the glass against downward movement from a partially open position in which an upper edge of the glass is intermediate the sill and an upper edge of the window opening, and a detachable support to allow an animal riding in the vehicle to safely extend its head through the space between the upper edge of the glass and the upper edge of the window opening, the support comprising first and second substantially parallel plate-form members connected together at respective upper edges to form a hook structure that is adapted to fit over the window glass when the window glass extends upward from the sill to a partially open position, with the first plate-form member being outside the vehicle and the second plate-form member being inside the vehicle, whereby the support rests on the sill and is retained in position by engagement of the hook structure with the window glass, and a third plate-form member extending inward from a lower edge of the second plate-form member, substantially perpendicular to the second plate-form member, whereby the third member forms a shelf extending inward from the sill.

BRIEF DESCRIPTION OF THE DRAWINGS

For a better understanding of the invention, and to show how the same may be carried into effect, reference will now be made, by way of example, to the accompanying drawings, in which FIG. 3 illustrates the paw support installed in a window opening.

DETAILED DESCRIPTION

Figure 1:
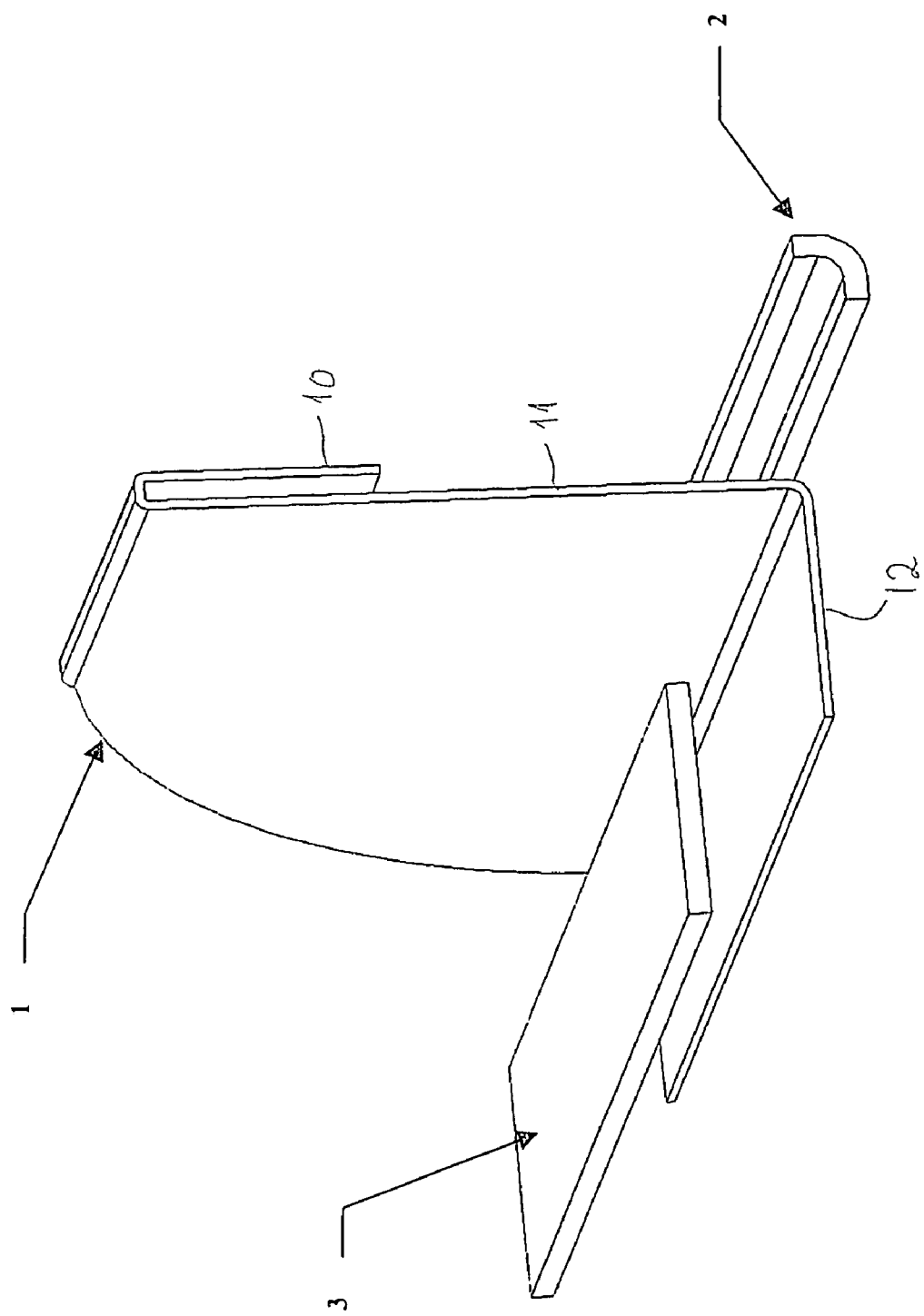
FIG. 1 is an exploded view of a paw support embodying the present invention.
Figure 2:
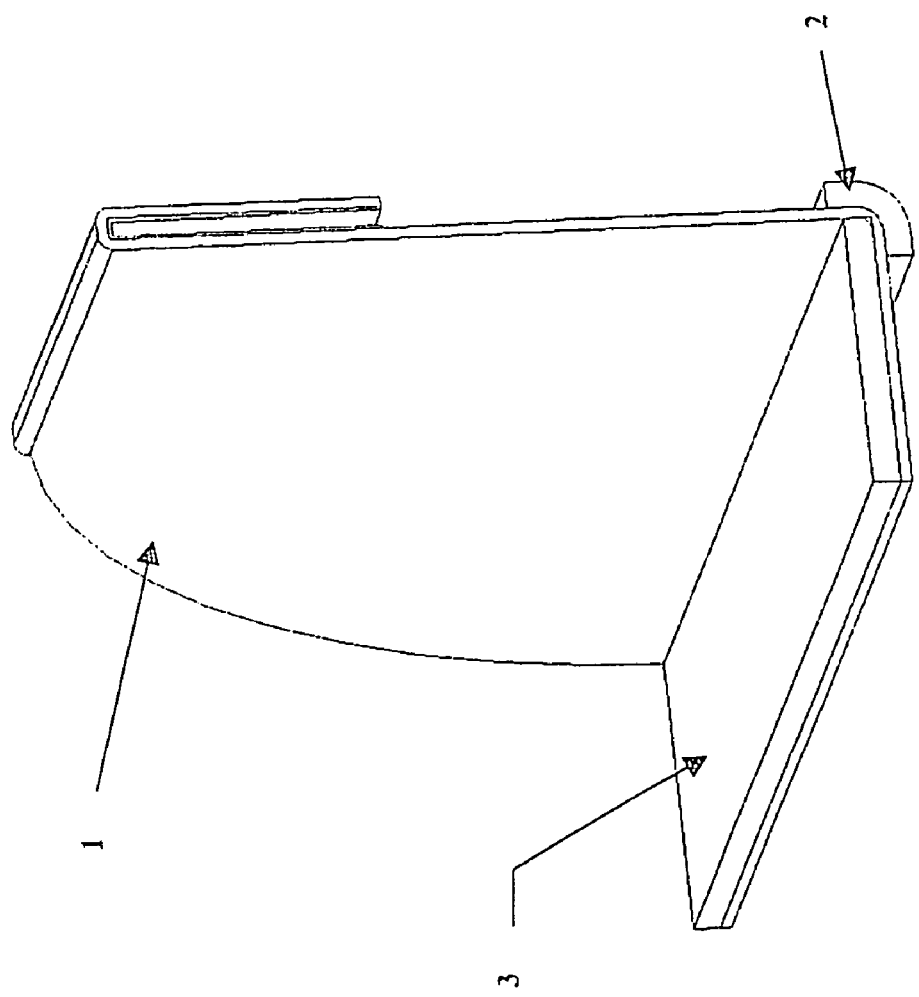
FIG. 2 is a perspective view of the paw support in assembled form.

FIGS. 1–3 illustrate a vehicle door 6 having a window opening 7 that is bounded at the bottom by a sill 8. A window glass 5 is mounted in the door and is moveable up and down to close and open the window opening by a window operator mechanism (not shown).

The drawings also illustrate a paw support 1, which comprises a stiff sheet of clear polycarbonate resin material that has been formed so that it has three main segments 10, 11 and 12. The first and second main segments 10 and 11 are parallel to one another and in spaced confronting relationship to form a hook structure that fits snugly over the window glass. The third segment 12 of the sheet projects perpendicularly from the lower edge of the second segment 11 so that when the hook structure is positioned over the window glass, the third segment projects inward relative to the door of the vehicle in the manner of a shelf.

A layer 3 of gripping material, such as carpet, is securely glued to the upper side of the third segment 12. A strip 2 of foam rubber or other cushioning material is attached to the outer surface of the right angle bend at which the second and third segments are joined.

In use of the paw support, the second segment of the paw support is placed against the inner surface of the window glass with the cushion material resting on the window sill and the window glass is raised so that the upper edge of the window glass enters the space between the first and second segments and just touches the top of the hook structure. The support then rests securely on the sill and the narrow slot defined between the segments 10 and 11 prevents the lower edge of the segment 11 from moving away from the glass so that the support no longer rests on the sill.

The height of the second segment 11 is selected so that when the upper edge of the window glass just touches the top of the hook structure, the window glass is sufficiently high that a dog will not be able to jump from the vehicle through the space between the upper edge of the window glass and the top of the window opening. A dog may then stand with its rear paws on a seat in the vehicle and its front paws on the shelf and the weight of the front paws will be supported by the sill of the window and the dog is able to stick its head out through the space between the upper edge of the window glass and the top of the window opening. In this manner, the sill of the window is protected from damage by the claws of the dog's front paws and the gripping surface of the layer 3 gives the dog security in the event that the driver of the vehicle executes a sudden stop or sharp turn. In addition, there is little likelihood that the dog's paws will engage the window controls, such as to actuate the window operator.

The paw support shown in the drawings is particularly intended for use by a dog but may be used by other animals also.

In a modification, the paw rest has a fourth segment that extends downward from the inner edge of the third segment and a second shelf projecting inward from the lower edge of the fourth segment. The outer surface of the fourth segment may rest against the arm rest and the second shelf then provides a support at a more convenient height for a larger dog.

It will be appreciated that the invention is not restricted to the particular embodiment that has been described, and that variations may be made therein without departing from the scope of the invention as defined in the appended claims and equivalents thereof. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated.

The invention claimed is:

1. A detachable support for an animal riding in a vehicle having a window glass that can be raised and lowered relative to a sill, said support comprising:

first and second substantially parallel plate-form members each having an upper edge and a lower edge, the first and second plate-form members being connected together at their respective upper edges to form a hook structure that is adapted to fit snugly over the window glass when the window glass extends upward from the sill to a partially open position, with the first plate-form member being outward of the window glass and the second plate-form member being inward of the window glass, whereby the support rests on the sill at the lower edge of the second plate-form member and is retained in position by engagement of the hook structure with the window glass, and the lower edge of the first plate-form member being above the lower edge of the second plate form member, a third plate-form member extending inward from the lower edge of the second plate-form member, substantially perpendicular to the second plate-form member, whereby the third member forms a shelf extending inward from the sill, and a layer of gripping material adhered to an upper surface of the third plate-form member.

2. A support according to claim 1, wherein the first, second and third plate-form members are respective parts of a unitary sheet of clear synthetic resin material.

3. A support according to claim 1, comprising a strip of cushion material attached to the first and second plate-form members for protecting the window glass and the sill from direct contact with the support.

4. A vehicle having a window opening bounded at a lower boundary by a sill, a window glass, a mechanism for raising and lowering the window glass relative to the sill for closing and opening the window, and for holding the glass against downward movement from a partially open position in which an upper edge of the glass is intermediate the sill and an upper edge of the window opening, and a detachable support to allow an animal riding in the vehicle to safely extend its head through the space between the upper edge of the glass and the upper edge of the window opening, the support comprising:

first and second substantially parallel plate-form members each having an upper edge and a lower edge, the first and second plate-form members being connected together at their respective upper edges to form a hook structure that is adapted to fit snugly over the window glass when the window glass extends upward from the sill to a partially open position, with the first plate-form member being outward of the window glass and the second plate-form member being inward of the window glass, whereby the support rests on the sill at the lower edge of the second plate-form member and is retained in position by engagement of the hook structure with the window glass, and the lower edge of the first plate-form member being above the lower edge of the second plate-form member, and a third plate-form member extending inward from the lower edge of the second plate-form member, substantially perpendicular to the second plate-form member, whereby the third member forms a shelf extending inward from the sill.

5. A vehicle according to claim 4, wherein the first, second and third plate-form members are respective parts of a unitary sheet of clear synthetic resin material.

6. A vehicle according to claim 4, wherein the support comprises a strip of cushion material attached to the first and second plate-form members for protecting the window glass and the sill from direct contact with the support.

7. A vehicle according to claim 4, further comprising a layer of gripping material adhered to an upper surface of the third plate-form member.

* * * * *